United States Patent [19]

Manabe et al.

[11] Patent Number: 5,133,910
[45] Date of Patent: Jul. 28, 1992

[54] DEVICE AND METHOD OF EVALUATING MOLDED PIECE FOR INJECTION MOLDING MACHINE

[75] Inventors: Norio Manabe, Mie; Yasuhiko Onishi, Aichi, both of Japan

[73] Assignee: Sumitomo Wiring Systems Ltd., Mie, Japan

[21] Appl. No.: 668,654

[22] Filed: Mar. 13, 1991

[30] Foreign Application Priority Data

Mar. 19, 1990 [JP] Japan ............................... 2-68586

[51] Int. Cl.[5] .............................................. B29C 45/77
[52] U.S. Cl. .................................. 264/40.4; 264/40.7; 425/140; 425/145; 425/149
[58] Field of Search ............... 425/140, 141, 145, 149; 264/40.3, 40.4, 40.7

[56] References Cited

U.S. PATENT DOCUMENTS

| | | | |
|---|---|---|---|
| 4,146,601 | 3/1979 | Bishop | 425/145 |
| 4,311,446 | 1/1982 | Hold et al. | 425/145 |
| 4,411,609 | 10/1983 | Yoshii et al. | 425/149 |
| 4,755,122 | 7/1988 | Schmidt | 425/140 |
| 4,833,910 | 5/1989 | Kenmochi | 425/149 |

FOREIGN PATENT DOCUMENTS

134239 6/1987 Japan.
187009 8/1987 Japan.

Primary Examiner—Tim Heitbrink
Attorney, Agent, or Firm—Sughrue, Mion, Zinn, Macpeak & Seas

[57] ABSTRACT

The injection molding machine is designed to produce molded pieces in a predetermined shape by moving back and forth a screw inside a cylinder so as to inject a molten molding material in the cylinder into a metal mold. The evaluation of molding stability of this injection molding machine is carried out in the following steps. First, an injection pressure imparted to the molten molding material by the screw at each screw position is detected, every time a molded piece is produced, and the injection pressure so detected is then integrated so as to obtain the work done of the injection molding machine. Following this, a molded piece so produced is weighed. Thus, a correlation between work done and the weights of molded pieces is statistically obtained on the basis of a plurality of corresponding data in relation to work done and the weights of molded pieces so obtained. Molding stability is then evaluated from the correlation so obtained.

7 Claims, 12 Drawing Sheets

NORMAL MOLDING

Fig. 12(b)

GENERATION OF STICKING

DEVICE AND METHOD OF EVALUATING MOLDED PIECE FOR INJECTION MOLDING MACHINE

BACKGROUND OF THE INVENTION

1. Field of the Invention

The present invention relates to a molding evaluating device for evaluating the molding stability or the like of molded pieces produced by an injection molding machine and a method for evaluating the same.

2. Statement of the Prior Art

In an injection molding machine for producing resin molded pieces, a screw is normally provided in a cylinder in such a manner as to move back and forth therein. The screw is advanced after the cylinder has been filled with a molten resin material so as to inject the molten resin material into a metal mold, and the resin material so injected into the metal mold is then cooled so as to be set up therein, a molded piece in a desired shape being thereby produced.

In order to provide molded pieces of a certain quality without fail, every time a molded piece is produced by the above injection molding machine, it is necessary to determine whether the molded piece so produced is good or defective. However, it is practically not possible for workers to accurately determine whether all molded pieces so produced are good or defective. In order to cope with this, there have been heretofore disclosed devices for automatically determining whether molded pieces are good or defective. For instance, the gazette of Japanese Patent Laid-Open No. 62-187009 discloses a device wherein waveform data showing a relationship between the position of a screw and the pressure (injection pressure) imparted to a molten resin material by the screw in a stage where good molded pieces are able to be produced in a stable manner are obtained and stored in a memory in advance, and wherein afterwards, every time a molded piece is produced waveform data showing a relationship between the position of the screw and the injection pressure when the molded piece is so produced are obtained for comparison with the waveform data already stored in the memory, the molded piece so produced being thereby determined as being good or defective.

However, with this method of determining whether molded pieces are good or defective, it is difficult to make a highly accurate determination, because in this method, molded pieces are determined as being good or defective in a qualitative fashion by comparing waveform data of two types with each other, in other words, recognizing waveform patterns.

In order to solve the problem inherent in the above prior art device, there have also been heretofore disclosed methods for determining whether molded pieces are good or defective in a quantitative manner. For example, the gazette of Japanese Patent Laid-Open No. 62-134239 discloses a method comprising the steps of detecting the injection speed and injection pressure of a screw, time integrating a value obtained by multiplying the injection speed by the injection pressure so detected during the time from the start of injection until the end of dwelling so as to obtain the total amount of energy (hereinafter referred to as "work done") imparted to a molten resin material by the injection molding machine via the screw, and then comparing the work done with a reference value set in advance so as to determine whether a molded piece is good or defective. Thus, in this example, since every time a molded piece is produced, a quantitative value (work done) in relation to the production is obtained, and since molded pieces are determined as being good or defective on the basis of the values so obtained, it is possible to take a determination more highly accurate than one in the case of the above-mentioned prior art device.

By the way, in a technical field of this kind, it is desirable not only to determine whether a molded piece is good or defective but also to monitor whether or not good molded pieces are continuously produced in a stable fashion (hereinafter referred to as "molding stability"), as well as how the temperature of a metal mold or the viscosity of a molten plastic material changes. However, there has been heretofore disclosed no device satisfying such a requirement.

SUMMARY OF THE INVENTION

An object of the present invention is to provide a molding evaluating device for an injection molding machine which is capable of accurately monitoring molding stability.

Another object of the present invention is to provide a molding evaluating method for an injection molding machine which enable accurate monitoring of molding stability.

With a view to accomplishing the above objects, there are two approaches made in the present invention.

A first approach is made toward a molding evaluating device for an injection molding machine in which a screw is moved back and forth inside a cylinder so as to inject a molten molding material in the cylinder into a metal mold to thereby produce a molded piece in a predetermined shape. This device comprises a position detecting means for detecting the position of the screw, a pressure detecting means for detecting the injection pressure imparted to the molten molding material by the screw, a weighing means for weighing the weight of a molded piece produced by the injection molding machine, and a molding evaluating means for evaluating molding stability by individually obtaining the work done by the injection molding machine that is required to produce each molded piece on the basis of the screw position data output from the position detecting means and the injection pressure data output from the pressure detecting means every time a molded piece is produced, and by statistically obtaining the correlation of the work done so obtained with the weights of the molded pieces weighed by the weighing means.

A second approach is made toward a molding evaluating method for an injection molding machine in which a screw is moved back and forth inside a cylinder so as to inject a molten molding material in the cylinder into a metal mold to thereby produce a molded piece in a predetermined shape. This method comprises a first process in which the work done by the injection molding machine is obtained by detecting the injection pressure imparted to the molten molding material by the screw at each Screw position every time a molded piece is produced, and by integrating the injection pressure so detected, a second process in which a molded piece is weighed every time it is produced, a third process in which the correlation of the work done with the weights of the molded pieces is statistically obtained on the basis of a plurality of corresponding data in relation to the work done and the weights of molded pieces obtained in the first and second processes, respectively, and a fourth process in which the molding stability is evaluated from the correlation obtained in the third process.

According to the present invention, the injection pressure is detected which is imparted to the molten molding material by the screw at each screw position every time a molded piece is produced, and the work done by the injection molding machine is obtained by integrating the injection pressure so detected, while the weight of each molded piece is weighed. The correlation of the work done with the weights of the molded pieces is statistically obtained on the basis of the plurality of corresponding data in relation to the work done and weights, and thereafter the molding stability is accurately evaluated from the correlation so obtained.

DETAILED DESCRIPTION OF THE PREFERRED EMBODIMENTS

A. Configuration of a Device

Figure 1:
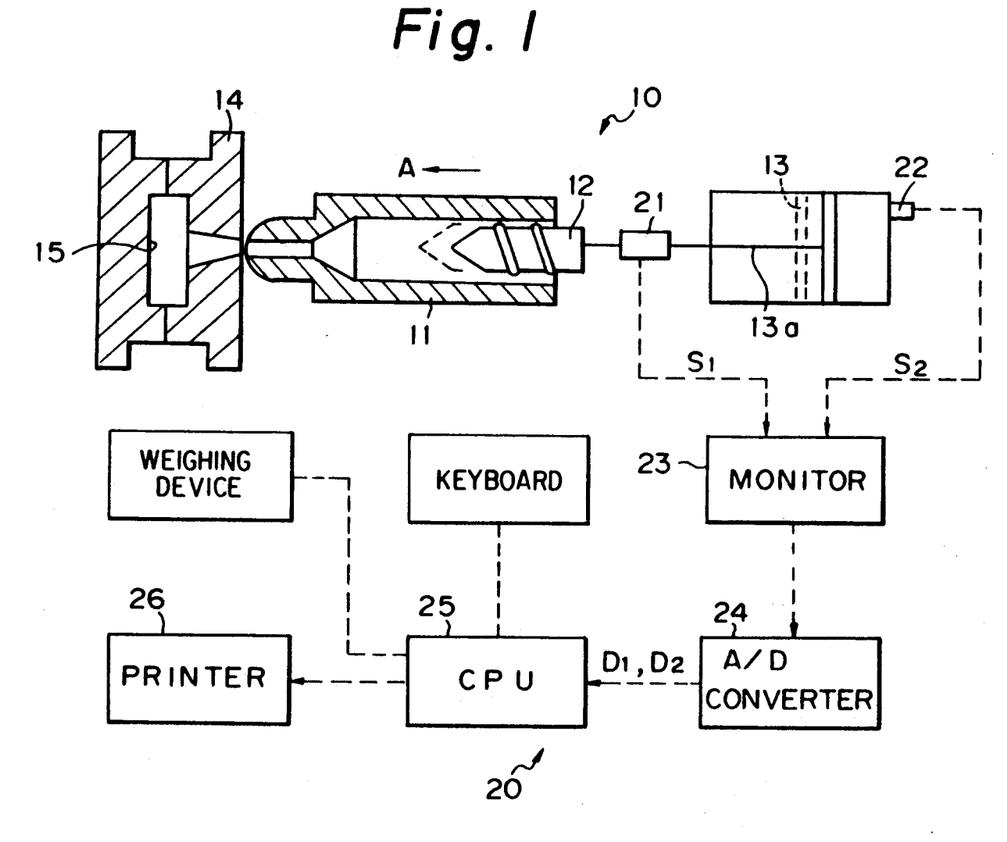
FIG. 1 is a block diagram of a molding evaluating device for an injection molding machine according to the present invention

FIG. 1 is a block diagram showing one embodiment of a molding evaluating device for an injection molding machine according to the present invention. As shown in the diagram, in the injection molding machine 10, a screw 12 is provided in such a manner as to move in the direction A along the inner circumferential surface of a heating cylinder 11. This screw 12 is connected to the piston portion 13a of an injection ram 13 for driving the screw. When the injection ram 13 is actuated so as to advance the screw 12 in the direction A, a molten resin (not shown) that has been filled in the heating cylinder 11 in advance is then injected into a cavity 15 of a metal mold 14.

A molding evaluating device 20 as one embodiment of the present invention is provided in the injection molding machine 10 configured as described above. This molding evaluating device 20 has an encoder (a position detecting means) 21 provided at the portion where the screw 12 and the piston portion 13a of the injection ram 13 are connected together so as to detect the position of the screw 12 and a hydraulic pressure detecting sensor (a pressure detecting means) 22 for detecting injection ram pressure, whereby a position signal $S_1$ related to the position of the screw 12 and a pressure signal $S_2$ related to the injection ram pressure, in other words, the pressure (injection pressure) imparted to a molten resin by the screw 12 are inputted to a monitor 23. This monitor 23 converts these signals $S_1$, $S_2$ into proper voltages corresponding to the position and injection pressure of the screw 12, respectively. Voltage values (analog values) related to the position and injection pressure of the screw 12 which are output from the monitor 23 are converted into digital signals $D_1$, $D_2$ by means of an A/D converter 24 and are then input into a CPU 25.

As also shown in FIG. 1, a keyboard is connected to this CPU 25 with which an operator inputs weight values of individual molded pieces after weighing the same, and the values input via this keyboard, that is, digital signals related to the weight of molded pieces are given to the CPU 25. Needless to say, the molding evaluating device 20 may be systematized by incorporating therein a weighing device for weighing the weight of a molded piece such that a signal related to the weight of a molded piece weighed by means of the weighing device is automatically given to the CPU 25, as illustrated in FIG. 1.

In this CPU 25, as will be described below, molding stability and the temperature change of the metal mold 14 are evaluated on the basis of these digital signals $D_1$, $D_2$ and signals related to the weight of molded pieces. A printer 26 is connected to the CPU 25 so that the evaluation results can be printed out.

B. Principle of Evaluation of Molding Stability

Prior to the description of an operation of the molding evaluating device 20, a principle of the evaluation of molding stability by the molding evaluating device 20 configured as described above will next be described.

The inventors of the present invention obtained, as will be described below, work done for each molded piece by means of the molding evaluating device 20 while continuously producing molded pieces by means of the injection molding machine 10, and also obtained a weight for each molded piece by means of the weighing device. The inventors then studied the correlation between the work done and the weights of molded pieces.

B-1. Calculation of Work Done

In a case where molded pieces are produced by means of the injection molding machine 10, the position and injection pressure of the screw 12 are continuously detected by means of the encoder 21 and the hydraulic pressure sensor 22, respectively, while injection molding pieces to be molded, and the injection pressures at the respective screw positions are stored in a memory (not shown) of the CPU 25.

Figure 2:
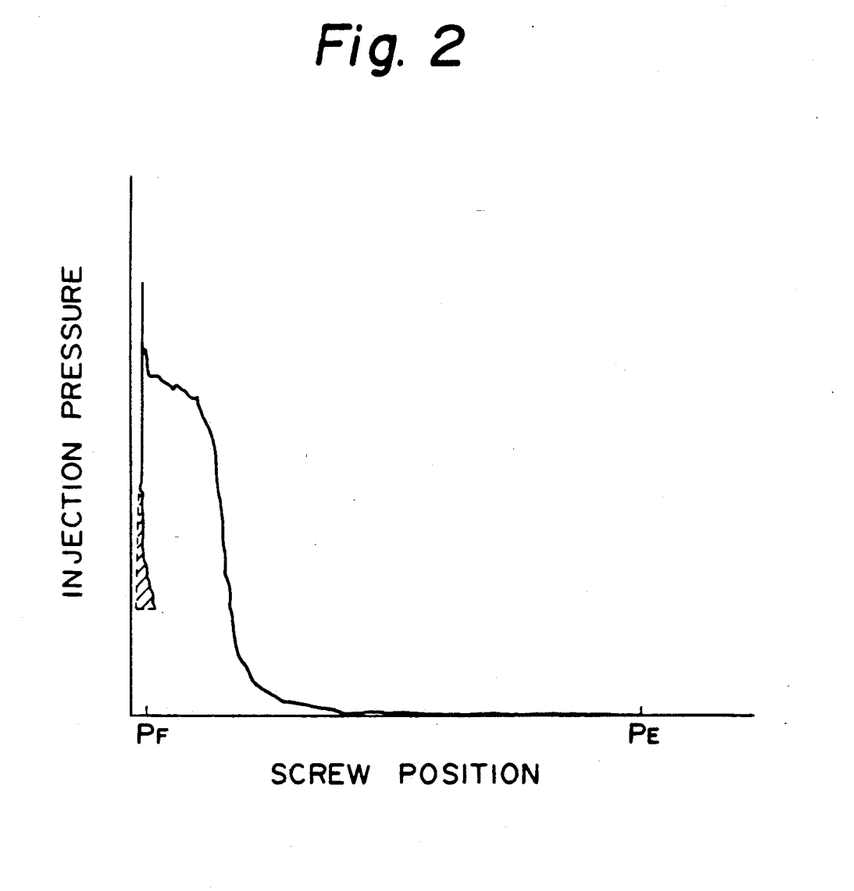
FIGS. 2, 6a, 6b, 12a and 12b are, respectively, charts showing the relationships between the position and injection pressure of a screw of the injection molding machine shown in FIG. 1.

When molded pieces have been produced, the following process is executed in the CPU 25, and work done X is then obtained. If the position and injection pressure of the screw 12 are continuously obtained as described above, a waveform pattern as shown in FIG. 2 is able to be obtained. Then, the values of injection pressures at the respective screw positions between the most-advanced position $P_F$ and the retreated position $P_E$ are sequentially read out of the memory, and work done is obtained by integrating the values so read out. In other words, the area of the waveform pattern (FIG. 2) showing the relationship between the position and injection pressure of the screw is obtained. In this embodiment, however, the work done $\Delta X$ corresponding to the diagonally lined portion of FIG. 2 is deducted from the work done that is obtained as described above. This is because a load in a reverse direction (−A direction) is applied to the screw 12 by molten resin filled in the cavity 15 of the metal mold 14 at the time of dwelling during the injection molding process.

Work done may be obtained by using any means other than trough the automatic operation by the CPU 25 as in the above case. For instance, a waveform pattern (FIG. 2) is drawn on a piece of Kent paper by means of an X-Y recorder, the operator cuts out the portion of the paper corresponding to the waveform pattern and obtains work done from the weight of the paper so cut out, and the work done so obtained is then input into the CPU 25. However, this method is inferior to a great extent to the above-mentioned method using the automatic operation by the CPU 25 in terms of accuracy, since the gram weight of a piece of Kent paper is not necessarily uniform all over the piece, and since it is not possible to draw a waveform pattern accurately due to the poor response of an X-Y recorder.

As is described above, in the present invention, the injection pressures at the respective screw positions during the injection molding process are directly measured by means of the pressure sensor 22, and the measured values are then integrated to thereby obtain work done X. Due to this, it is possible to obtain work done with a high degree of accuracy. In addition, although the load in a reverse direction (the diagonally lined area of FIG. 2) applied by molten resin that has already been filled in the cavity in a dwelling state is totally ignored in the prior art injection molding machine, a certain consideration is given to this load in this embodiment. Due to this, the work done X obtained in this embodiment can substantially coincide with actual work done.

B-2. Measurement of Weight of Molded Pieces

Every time a molded piece is produced, it is transferred to a weighing apparatus, where the weight of the molded piece is weighed.

B-3. Correlation between Work Done and Weights of Molded Pieces

Figure 3A:
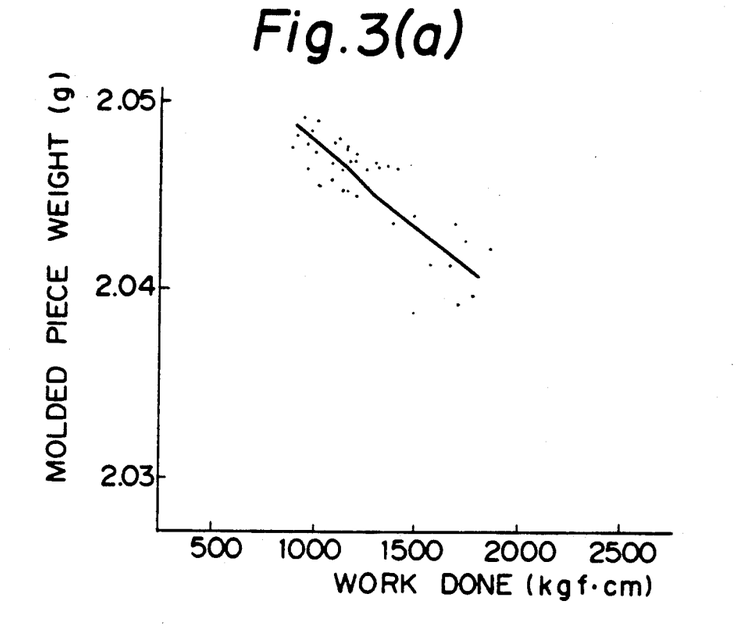
FIGS. 3a, 3b, 11a and 11b are, respectively, charts showing the correlations between the weight of molded pieces and work done.
Figure 3B:
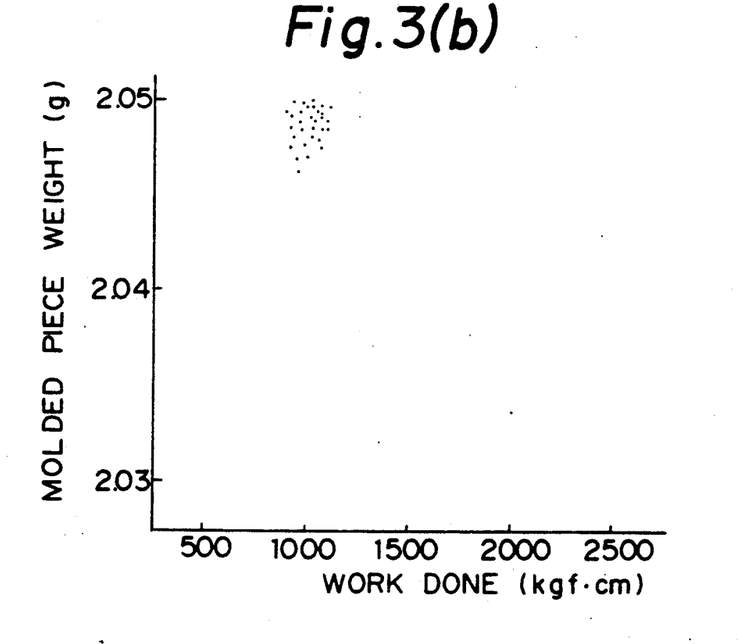

The inventors of the present invention obtained work done and a weight for each molded piece as described above, and then obtained the results as shown in FIG. 3. FIG. 3(a) shows the results from the start of injection molding until the time when the fiftieth molded piece was produced, and FIG. 3(b) shows the results from the time when the fifty-first molded piece was produced until the time when the hundredth one was produced.

As is clear from those charts, the data relatively scatter until the fiftieth molded piece was produced, while the data remain substantially within a certain range after the fifty-first molded piece was produced. In other words, it can be concluded that it was possible to produce without fail molded pieces of a certain weight with certain work done during the injection molding after the fifty-first one was produced, and that the molding stability was superior.

Therefore, it is possible to evaluate molding stability by measuring work done and a weight for each molded piece while producing a certain number of molded pieces, and by studying the correlation between the work done and weights so measured.

C. Evaluation of Molding Stability

Figure 4:
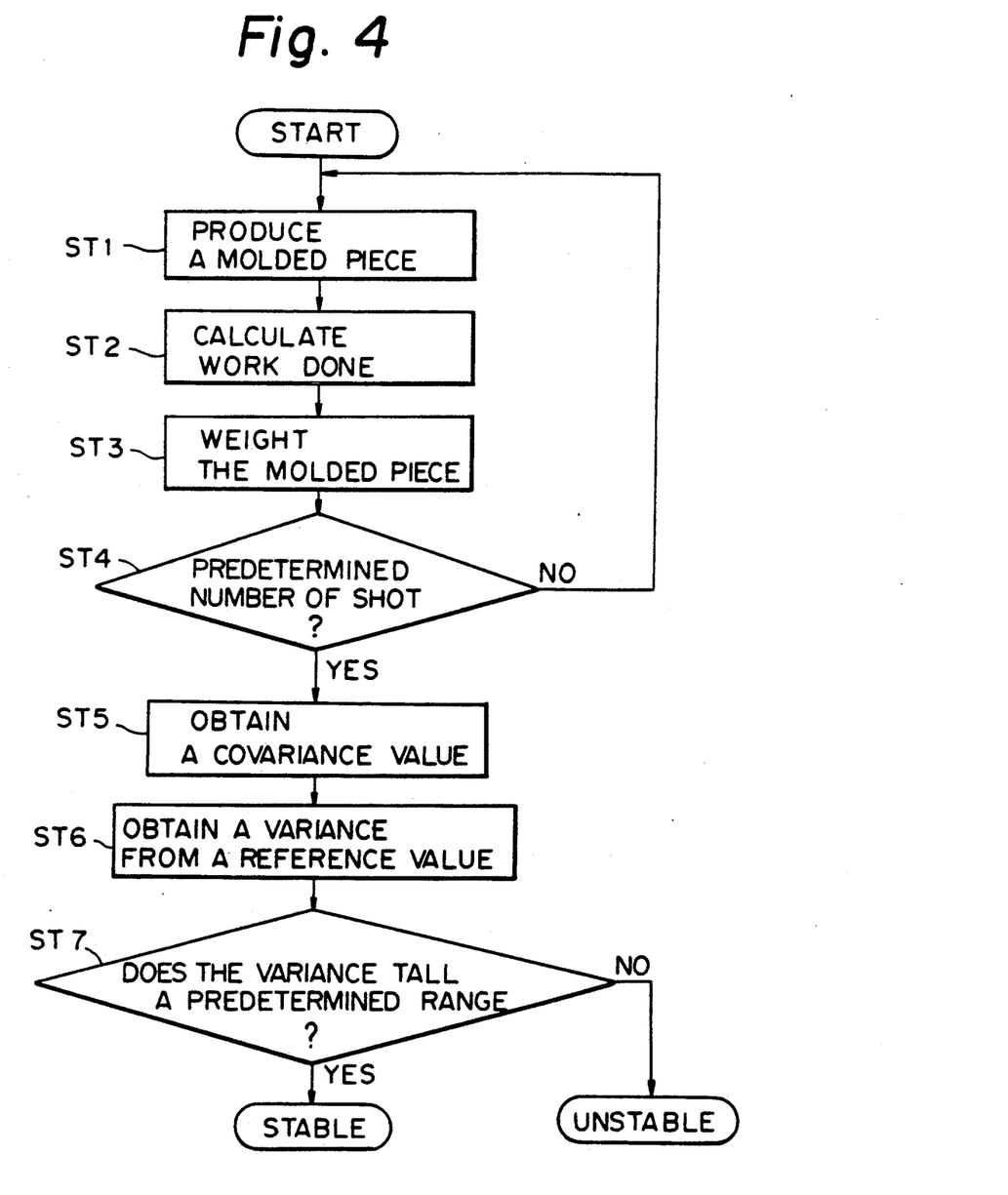
FIG. 4 is a flow chart showing the operation of one embodiment of the molding evaluating device according to the present invention.

Next, referring to FIG. 4, an evaluating operation of the molding evaluating device 20 for evaluating molding stability will now be described.

When the operator gives an injection molding start command to the CPU 25 of the molding evaluating device 20 by operating an operator control panel (not shown), various command signals are then given to the respective portions of the injection molding machine 10, and a molded piece in a predetermined shape is produced by means of the injection molding machine 10 (step ST1). Afterwards, work done X required to produce the relevant molded piece is accurately obtained by means of the CPU 25 as described above (step ST2), and the work done X so obtained is then stored in the memory of the CPU 25.

Then, the molded piece is withdrawn from the metal mold 14, and the weight Y of the molded piece is measured by means of the weighing device not shown (step ST3). The operator inputs the measuring results into the CPU 25 via the keyboard, data related to the weight Y of the molded piece being thereby stored in the memory.

In a step ST4, it is determined whether or not the injection molding process has been repeated in a predetermined number of shots so as to produce the predetermined number of molded pieces. When it is judged that the predetermined number of shots have not been completed, the processes of the above steps ST1 to ST3 are then executed until the required number of shots have been completed.

In contrast, in the step ST4, when it is judged that the predetermined number of shots or more have already been completed, molding stability is then evaluated on the basis of the work done data X and molded piece weight data Y which are stored in the above-mentioned memory.

In this embodiment, a statistical method is used to evaluate molding stability. In other words, in a case where there is a correlation between the work done and weights of molded pieces, if significance can be obtained through a variance analysis, molding stability is regarded as being unstable; otherwise molding stability is regarded as being stable.

In addition to this, a covariance value of work done with the weights of molded pieces is also employed, and it is recognized that there is a correlation as shown in Table 1 between the work done and molded piece weights.

TABLE 1

| | Variance analysis significance | | Covariance |
| --- | --- | --- | --- |
| | Existing | Not existing | |
| Molding stability good | — | ○ | Small |
| Molding stability poor | ○ | — | Great |

In this embodiment, a covariance value $S_{XY}$ is obtained on the basis of the following equation (step ST5):

$$S_{XY} = \sum_{i=1}^{n} X_i \cdot Y_i - \left( \sum_{i=1}^{n} X_i \right) \cdot \left( \sum_{i=1}^{n} Y_i \right) / n$$

Then, after a variation between the covariance obtained in the step ST5 and a reference value set in advance is obtained (step ST6), whether or not the variation so obtained falls within a certain range is judged (step ST7). In this step ST7, when the variation is judged as falling within the certain range, in other words, when molding stability is judged as being good, a signal indicating to that effect is output, for instance, to the printer 26, the operator being thereby informed that molded pieces are being stably produced. On the contrary, when the variation is judged as not falling within the certain range, in other words, molding stability is judged as not being good, a signal indicating to that effect is output to the printer 26, the operator being thereby informed that molded pieces are being produced with molding stability being poor.

D. Others

The evaluation of molding stability has heretofore been described. On top of this, with the present invention, it is possible to be aware how the temperature of a metal mold changes, or how the viscosity of a molten material changes through the molding evaluating device 20 configured as shown in FIG. 1 with a relatively high degree of accuracy.

The following are descriptions of how those changes are studied.

State in which the temperature of a metal mold changes

Figure 5:
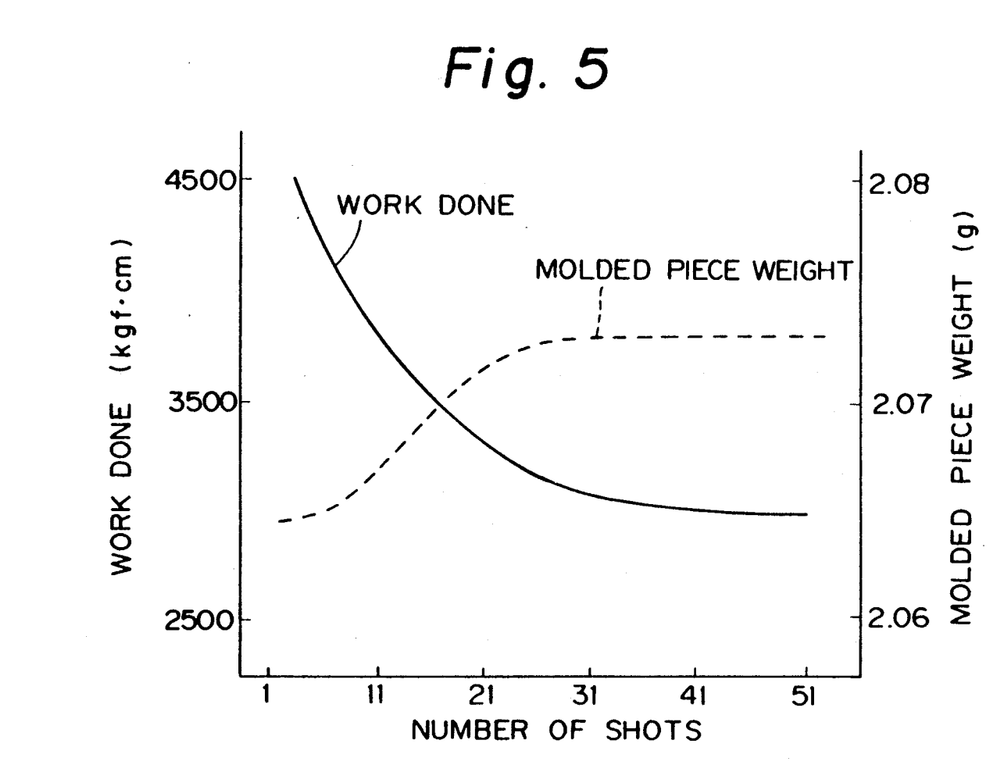
FIGS. 5, 10a and 10b are, respectively, charts showing states in which the work done and the weight of molded pieces change during a continuous molding.

This inventors of the present invention obtained work done and a weight for each molded piece by means of the molding evaluating device 20 and the weighing device, respectively, while continuously producing molded pieces by means of the injection molding machine 10, and studies relationships between the number of shots and changes of work done and the weights of molded pieces with time, respectively. FIG. 5 is a chart typically showing the results of the study, in which a solid line shows the relationship between work done and the number of shots, while a dotted line shows the relationship between the weights of molded pieces and the number of shots.

As shown by the solid line in the chart, work done decreases as the number of shots increases from the start of injection molding until the time when 20 to 30 shots have been completed, and thereafter work done remains stable. This phenomenon may be considered in the following way. When the number of shots increases, the temperature of the metal mold 14 gradually rises, and this allows molten resin to be smoothly injected into the metal mold 14, work done being thereby caused to gradually decrease from the start of injection molding until the time when 20 to 30 shots have been completed, where work done becomes stable. Therefore, it can be concluded that the decrease of work done in the above-mentioned stage is regarded as resulting from the rise of the temperature of the metal mold 14, and that thereafter the temperature of the metal mold 14 stopped to rise and was stabilized, work done being thereby stabilized. Thus, it is possible to study a state in which the temperature of the metal mold 12 changes by obtaining work done every time a molded piece is produced, and by analyzing how work done changes.

In addition, as shown by the dotted line in FIG. 5, the weight of molded pieces increases as the number of shots increases from the start of injection molding until the time when 20 to 30 shots have been completed, and thereafter becomes substantially stable, indicating that the quality of molded pieces being produced becomes stable. These two phenomena indicate that the empirical rule of carrying out waste shots is right, in other words, it is right to waste at the production site molded pieces produced from the start of injection molding to the time when 20 to 30 shots have been completed, since most of them are defective.

State in which the viscosity of a molten material changes

Figure 6A:
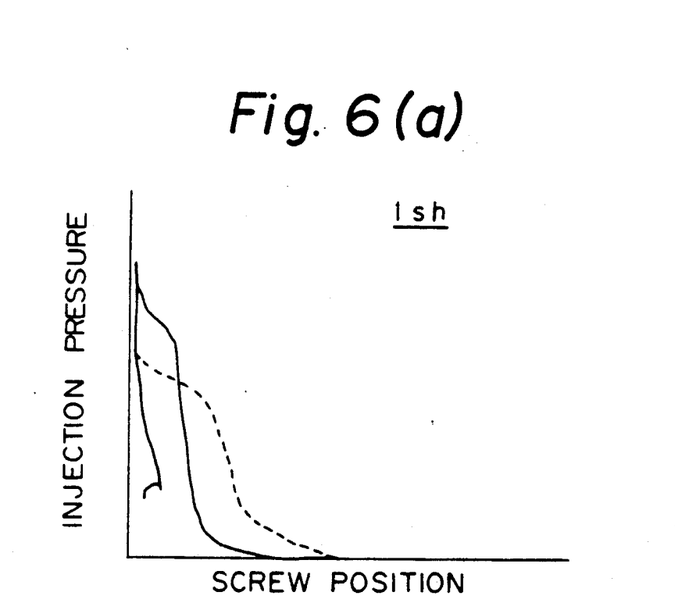
Figure 6B:
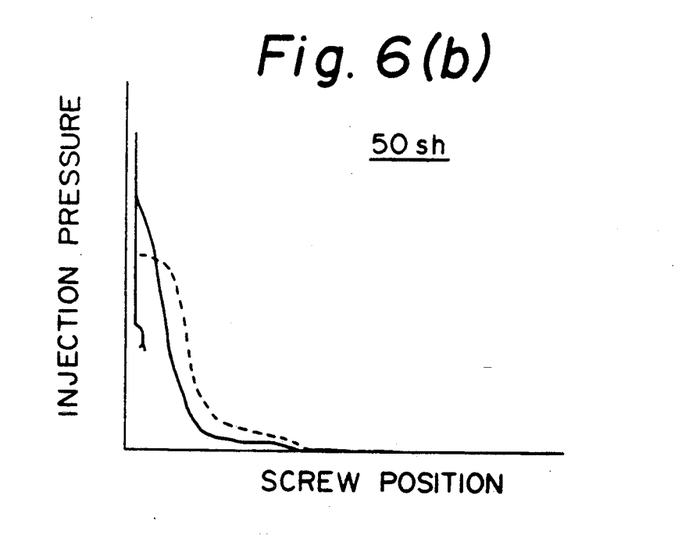

The inventors of the present invention prepared two types of poly butylene terephthalates (hereinafter referred to as "PBT") having different flow properties. Each PBT was filled in the injection molding machine 10, and while continuously producing molded pieces, waveform patterns were obtained via the molding evaluating device 20 at the start of injection molding (first shot) and a fiftieth shot, respectively. FIGS. 6(a) and 6(b) show waveform patterns at the first and fiftieth shots, respectively. In the charts, a solid line indicates the PBT having high flow properties (MI value=3.0 g/10 min), and a dotted line indicates the one having low flow properties (MI value=2.0 g/10 min). As is clear from the charts, in a case where molded pieces were produced from the PBT having high flow properties, the waveform pattern became sharp, and work done was lowered, while in a case where the PBT having low flow properties was used, the waveform pattern became gentle, and work done was increased.

Figure 7:
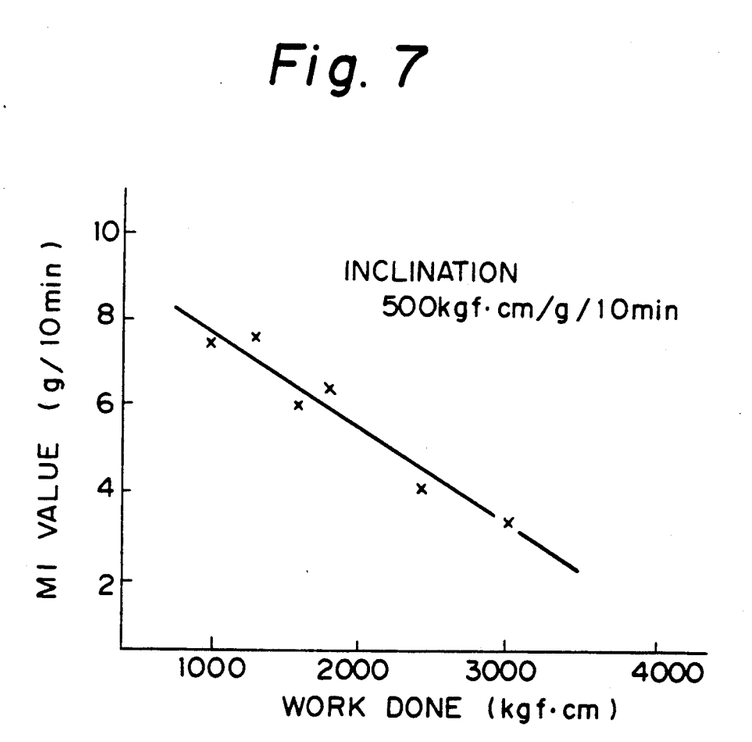
FIG. 7 is a chart showing the relationship between the work done and the flow properties.

Furthermore, in order to study the relationship between work done and the flow properties of the molten resins, the inventors of the present invention obtained a correlation between the flow properties (MI values) of the molten resins and work done. FIG. 7 is a chart showing the results obtained. As shown in the chart, work done increases in a certain proportion ($-500$ kgf·cm/g/10 min) as the flow properties became lower, in other words, as MI values became smaller.

Therefore, although there has been heretofore no way but to evaluate the flow properties of a molten resin after a lapse of time in an indirect manner by actually measuring the MI value of a molded piece by means of a melt indexer, with the molding evaluating device 20, it is possible to judge the flow properties of a molten resin used on a realtime basis from waveform patterns and/or the magnitude of work done. Moreover, it is also possible to accurately study how the viscosity of a molten resin used changes on a real-time basis by unit continuously obtaining work done and then by looking at how it changes.

Detection of the property modification of a molten resin

Figure 8:
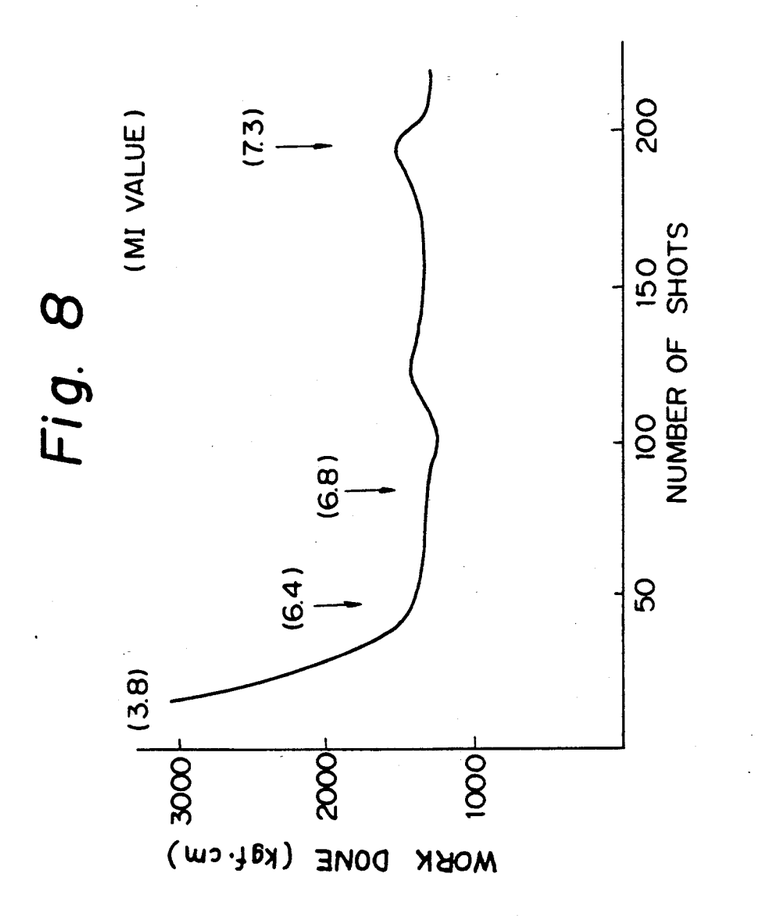
FIGS. 8 and 9 are, respectively, charts showing states in which the work done and the flow properties change during a continuous molding.
Figure 9:
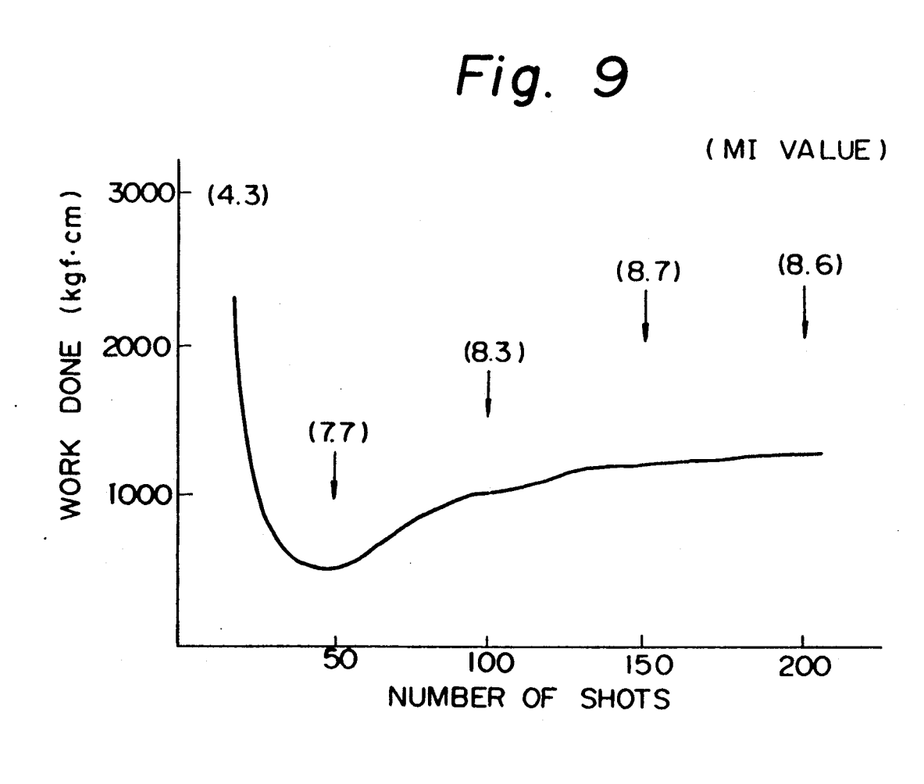

As is conventionally known, with a molten resin, for instance, with a PBT, when a property modifications occurs therein due to hydrolysis or the like, the flow properties thereof increases. In view of this, the inventors of the present invention obtained work done for each molded piece by means of the molding evaluating device 20, while continuously producing molded pieces by means of the injection molding machine 10, and also measured the flow properties (MI values) of a PBT used at predetermined numbers of shots. FIGS. 8 and 9 are charts showing the results, the former chart showing a case in which water control was performed such that the water content of the molten resin becomes below 0.02 wt %, the latter chart showing a case in which such a water control was not performed, in other words, a case in which the water content of the molten resin became 0.02 wt % or more.

When comparing the two charts with each other, the flow properties of FIG. 9 is generally higher than that of FIG. 8. As described above, it is considered that the higher flow properties of FIG. 9 indicates that the property modification occurred in the material due to hydrolysis or the like. In addition, work done decreased as the number of shots increased. This phenomenon coincides with the correlation between the flow properties (MI values) of the molten resin and work done, which was previously explained.

Therefore, with the molding evaluating device 20, it is possible to detect the property modification of a molten resin by continuously obtaining work done and then by looking at how it changes. In addition, instead of MI values, work done may be designed to be continuously obtained.

Evaluation of molding stability when a reprocessed material is used

A recycle material (reprocessed material) is often used to produce injection molded pieces from the point of view of reusing resources. Then, molding stability during an injection molding process with recycle materials being used was studied in the same manner as described above.

Figure 10A:
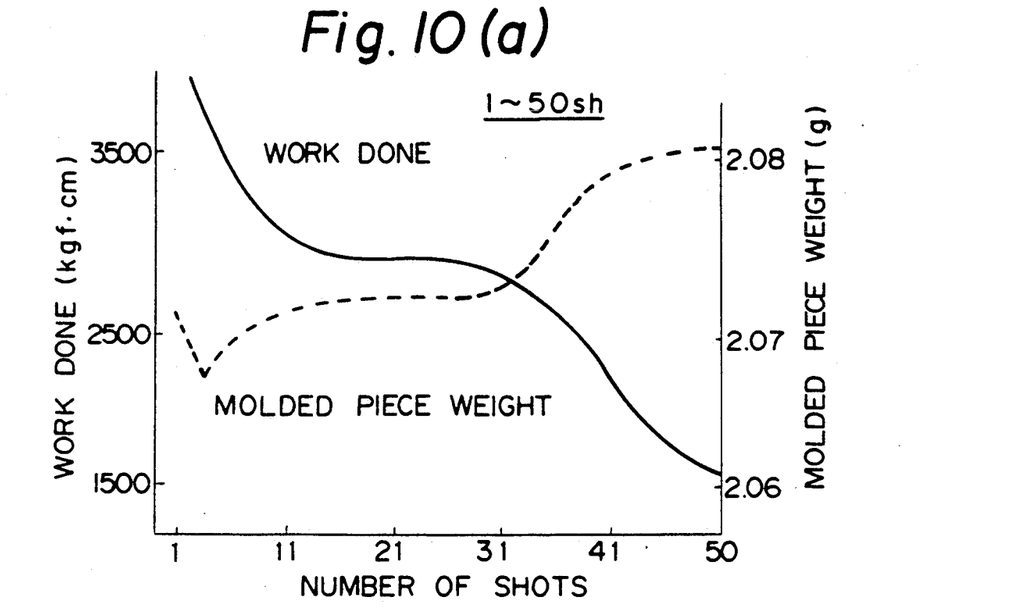
Figure 10B:
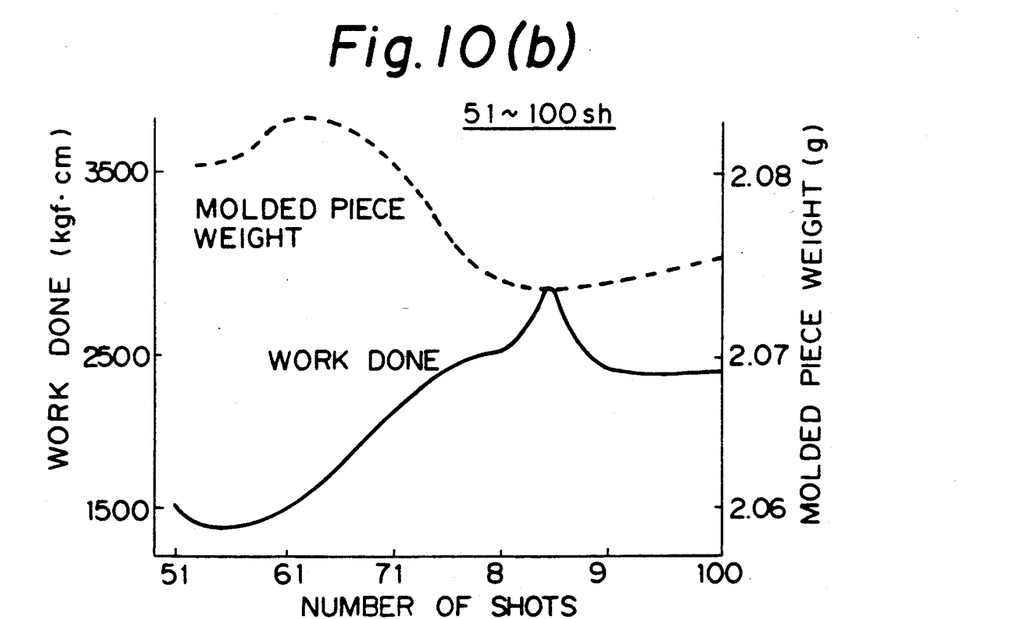

While continuously producing molded pieces by means of the injection molding machine 10, relationships between the number of shots and work done as well as the weights of molded pieces were studied by obtaining work done and a weight for each molded piece by means of the molding evaluating device 20 and the weighing device, respectively. FIG. 10 are charts typically showing the results of the study, the chart (a) showing the results from the start of injection molding to the time when a fiftieth molded piece was produced, the chart (b) showing the results from the time when a fifty-first molded piece was produced to the time when a hundredth one was produced. In those charts, solid lines indicate the relationship between work done and the number of shots, while dotted lines indicate the relationship between the weights of the molded pieces and the number of shots.

Figure 11A:
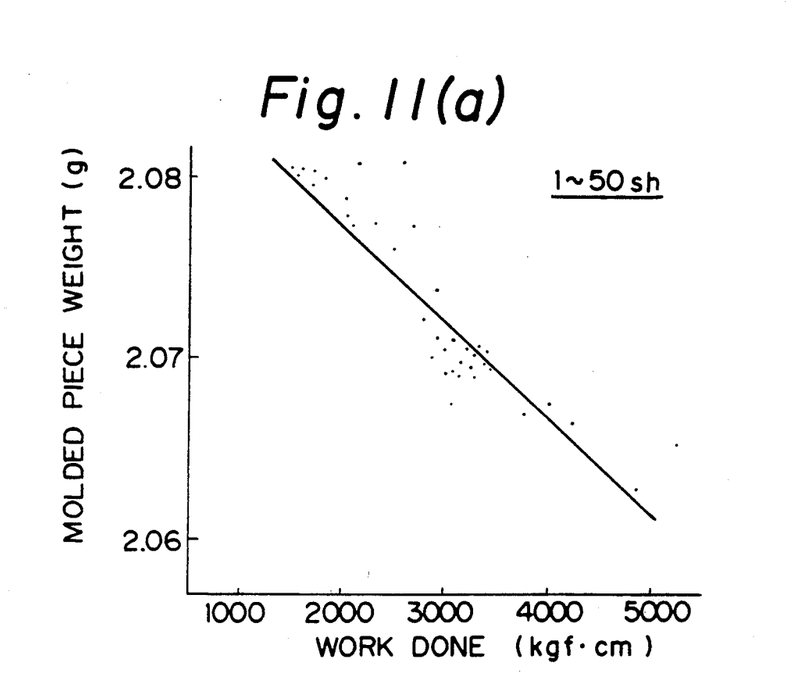
Figure 11B:
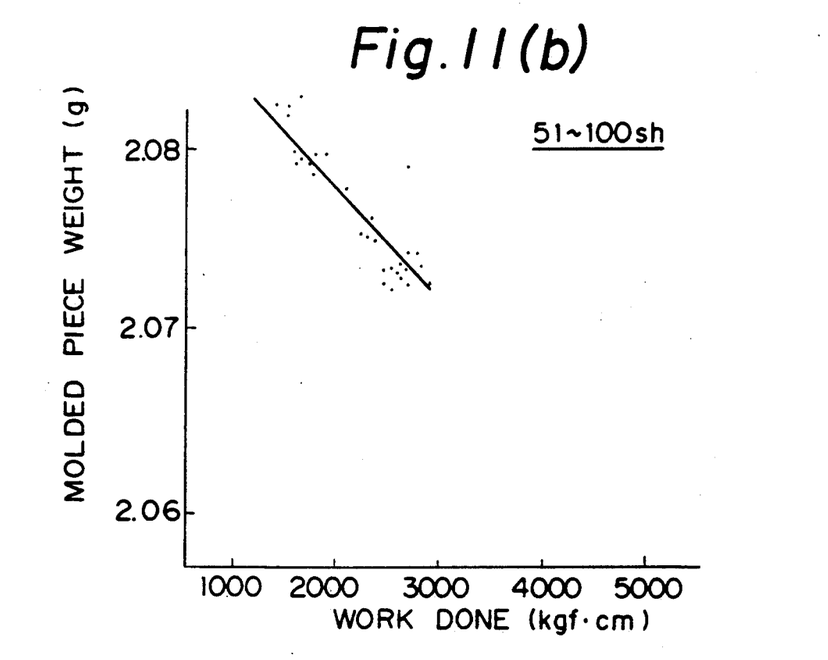

In addition, a correlation between work done and the weights of the molded pieces was also studied from the work done and molded piece weights obtained as described above. FIG. 11 are charts showing the results of the study, the chart (a) showing the results from the start of injection molding to the time when a fiftieth molded piece was produced, the chart (b) showing the results from the time when a fifty-first molded piece was produced to the time when a hundredth one was produced.

When comparing the case in which an injection molding process was carried out using a normal material (virgin material) with the case in which an injection molding process was carried out using a recycle material, as is clear from FIG. 3, most of the data do not scatter after the fifty-first shot was carried out in the first case, while as is shown in FIG. 11, the data still scatter even after the hundredth shot was carried out in the latter case. This result coincides with the empirical rule that molding stability decreases when an injection molding process is carried out using recycle materials.

Therefore, with the molding evaluating device according to the above embodiment, it is possible to properly evaluate molding stability not only in the case in which an injection molding process is carried out using a normal material but also in the case in which an injection molding process is carried out using a recycle material.

Sticking of resin to a metal mold

Figure 12A:
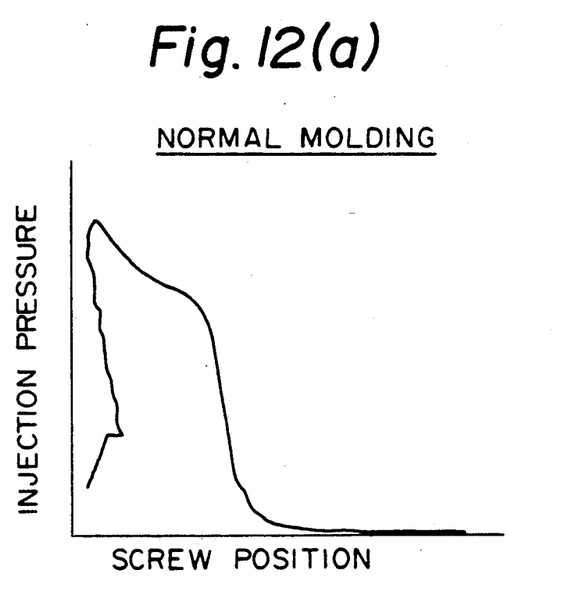
Figure 12B:
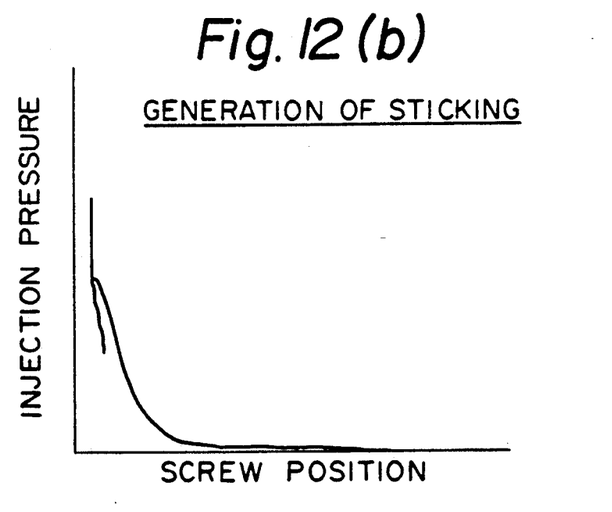

It often happens that a resin used suddenly sticks to a metal mold during a continuous molding. Waveform patterns during a normal molding process and those when a resin happens to stick to the metal mold were obtained by means of the molding evaluating device 20 configured as shown in FIG. 1, respectively. FIG. 12(a) shows the former waveform patterns, while FIG. 12(b) shows the latter waveform patterns. As is clear from those charts, when the resin sticked to the metal mold, there is something abnormal in the waveform pattern, and the work done at the time remarkably decreased.

Therefore, with the molding evaluating device 20, it is possible to detect sticking of a resin used to the metal mold by obtaining work done for each molded piece while continuously producing molded pieces, and then by looking at work done so obtained. For instance, a variation between work done for each molded piece and a reference value set in advance is calculated, and whether or not the variation so calculated falls within a predetermined range is judged. Thus, it may be constructed such that in a case where the variation falls within the predetermined range, a molding process being carried out is judged as being proper, while in a case where the variation does not fall within the predetermined range, sticking of a resin to the metal mold is judged as occurring.

As is described above, in the present invention, every time a molded piece is produced, an injection pressure applied to a molten molding material by the screw at each screw position is detected, and the work done of the injection molding machine is obtained by integrating the injection pressure so detected. In addition, the weight of a molded piece is also weighed, and weight data are collected. Then, a correlation between the work done and weights of molded pieces is statistically obtained on the basis of those work done and weight data, and thereafter molding stability is evaluated from the correlation so obtained. Thus, with the present invention, it is possible to accurately monitor molding stability.

What is claimed is:

1. A molding evaluating method for an injection molding machine in which a screw is moved back and forth inside a cylinder so as to inject a molten molding material in said cylinder into a metal mold to thereby produce a molded piece in a predetermined shape, said method comprising the following steps:
    determining work done by said injection molding machine by detecting an injection pressure imparted to said molten molding material by said screw at each screw position every time a molded piece is produced, and by integrating the injection pressure so detected;
    weighing a molded piece each time said molded piece is produced;
    determining a correlation between the work done and the weights of molded pieces on the basis of a plurality of corresponding data in relation to the work done and the weights of molded pieces obtained in said work determining and weighing steps, respectively; and
    evaluating molding stability from the correlation obtained in said correlation determining step.

2. A molding evaluating device for an injection molding machine in which a screw is moved back and forth inside a cylinder so as to inject a molten molding material in said cylinder into a metal mold to thereby produce a molded piece in a predetermined shape, said device comprising:

position detecting means for detecting a position of said screw;

pressure detecting means for detecting an injection pressure imparted to said molten molding material by said screw;

weighing means for weighing the weight of a molded piece produced by said injection molding machine; and molding evaluating means for evaluating molding stability by individually obtaining work done by said injection molding machine that is required to produce each molded piece on a basis of screw position data output from said position detecting means and injection pressure data output from said pressure detecting means. every time a molding piece is produced, and by statistically obtaining the correlation between the work done so obtained and the weights of the molded pieces weighed by said weighing means.

3. A molding evaluating device for evaluating a mold piece, comprising:

a cylinder;

a screw slidably disposed in said cylinder to inject a molten molding material from said cylinder into a metal mold;

an injection ram for driving said screw;

an encoder for detecting the position of said screw;

a hydraulic pressure detecting sensor for detecting injection ram pressure;

monitor means for converting a position signal $S_1$ related to the position of said screw and a pressure signal $S_2$ related to an injection ram pressure imparted to a molten resin by said screw into analog voltages values corresponding to the position and injection ram pressure of said screw, respectively;

an A/D convertor for converting said analog voltage values related to the position and injection ram pressure of said screw which are output from said monitor into digital signals $D_1$, $D_2$; and a CPU for determining the amount of work done in forming said molded piece based upon said digital signals.

4. A molding evaluating device as set forth in claim 3, further comprising a keyboard electrically coupled to said CPU with which an operator inputs weight values of individual molded pieces which are transmitted to the CPU via said keyboard.

5. A molding evaluating device as set forth in claim 3, further comprising a weighing device for weighing the molded piece so that a signal corresponding to the weight of the molded piece can be automatically transmitted to said CPU.

6. A molding evaluating device as set forth in claim 3, wherein molding stability and the temperature change of a metal mold are evaluated on the basis of said digital signals $D_1$, $D_2$ signals related to the weight of molded pieces.

7. A molding evaluating device as set forth in claim 3, further comprising a printer electrically coupled to said CPU to print out evaluation results.

* * * * *